March 15, 1938.　　　　P. O. HECHT　　　　2,111,243
CONDUIT CONNECTION
Filed Feb. 17, 1937

Inventor:
Paul O. Hecht.
By Parker, Carlson, Pitzner & Hubbard
Attorneys

Patented Mar. 15, 1938

2,111,243

UNITED STATES PATENT OFFICE 2,111,243

CONDUIT CONNECTION

Paul O. Hecht, Davenport, Iowa, assignor to Kwikon Company, Chicago, Ill., a corporation of Illinois Application February 17, 1937, Serial No. 126,123

2 Claims. (Cl. 285—161)

The invention relates to connecters and more particularly to connecters adapted for use with so-called thin walled electrical conduit or tubing.

The use of light gauge seamless steel tubing as an electrical conduit, known as thin walled conduit, has numerous advantages from the standpoint of cost, weight, and ease of manipulation. Such tubing may be readily bent to conform to the contour of even intricate building structures in which it is to be located without the necessity of providing elbow joints and the like such as must be used with rigid conduit. Its use has been handicapped, however, by the lack of suitable connecters for securing the ends of the conduit to outlet boxes, joining together sections of the conduit, and for other like purposes. A number of different factors have contributed to complicate the problem of devising a suitable connecter. In the first place, the device must be extremely simple and cheap to manufacture if the over-all cost of the conduit system is to be low enough to compete with older and highly developed forms of conduits and fittings. Also, the device should be of such character that an ordinary electrician can install it with the few simple tools, such as a screw driver and pliers, which usually make up his kit, and it must be possible to make the installation in cramped corners and crevises of buildings that are accessible only under the greatest of difficulty. Finally, the very qualities which make thin walled conduit desirable also make it very difficult to apply a connecter. Its thin light gauge metal walls preclude the use of heavy compressive forces and yet the underwriters require that a connecter for such conduit, when having a diameter of three-fourths of an inch for example, withstand a straight pull of approximately 700 pounds. The problem of strength of the joint is also made more difficult by the fact that nice fits of the parts cannot be had since economical manufacture of the conduit necessitates wide tolerances in its diameter.

The general object of the present invention is to provide a simple, economical connecter for use with thin walled metal conduit which may be manipulated by ordinary tools in a limited space and which is adapted to withstand an extremely heavy pull tending to dislodge the same from the conduit.

A more specific object of the invention is to provide such a connecter which is adapted to compress a portion of the conduit wall into a hardened mass forming a bearing shoulder cooperating with a projection on the connecter to prevent dislodgment of the conduit by an endwise pull.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawing in which Figure 1 is a perspective view of a connecter embodying the invention.

Figure 1:
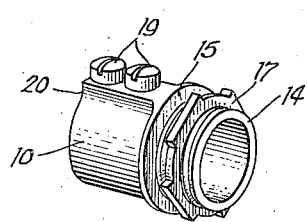

Referring more particularly to the drawing, the invention has been shown for purposes of illustration of its various novel features as embodied in a connecter adapted to secure the end of a portion of thin walled metal conduit to an outlet box or the like but it will be understood by those skilled in the art that connecters embodying the invention may be adapted for a wide variety of other uses. In general, the connecter herein contemplated is provided with a body portion adapted to fit about the conduit and an improved arrangement for securing this body portion in position which serves to compress a portion of the conduit wall in a hardened mass to form a bearing shoulder cooperating with a projection on the connecter to prevent dislodgment of the conduit by an endwise pull.

Figure 2:
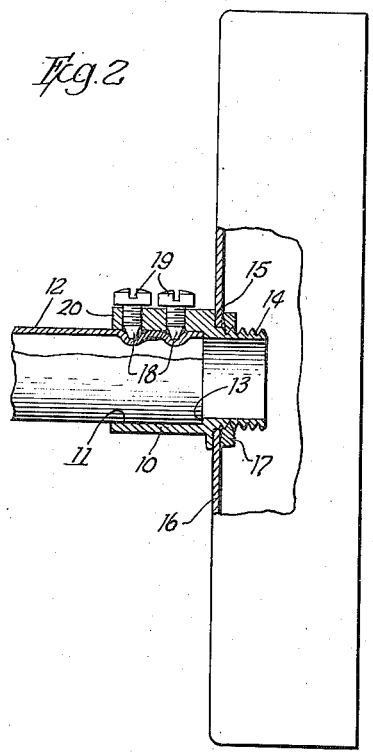
Fig. 2 is a longitudinal sectional view of the connecter in Fig. 1 as applied to an outlet box.

The particular connecter illustrated is provided with a generally tubular or cylindrical body portion 10 having a longitudinally extending opening 11 therein adapted to be telescoped over the end of a section of thin walled metal electrical conduit or tubing 12 (Fig. 2). An annular shoulder 13 formed within the opening 11 cooperates with the marginal edge of the conduit 12 to limit its endwise movement into the connecter. The securing arrangement hereinafter described is of such character that the opening 11 may be made of sufficiently large diameter as to accommodate tubing having a comparatively wide variation from a standard diameter. The manufacture of the tubing or conduit is thus simplified as well as that of the connecter since the tolerances for the interfitting parts are comparatively large.

As was previously noted, the particular connecter illustrated is adapted to be secured to an outlet box or similar casing member. For this purpose a threaded annular extension 14 is formed on the outer end of the connecter body and terminates in a shoulder 15. Thus, as shown in Fig. 2, the threaded end or boss 14 may be inserted in a suitable opening in the wall of a box 16 and the connecter clamped in position by a lock nut 17 cooperating with the shoulder 15 to engage the marginal edges of the box wall.

Figure 3:
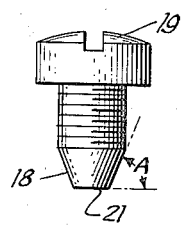
Fig. 3 is an enlarged detail view of one of the set screws included in the connecter shown in Fig. 1.

A plurality of spaced projections illustrated in the form of blunt ends or points 18 on set screws 19 are arranged to engage the inserted end portion of the conduit 12. The set screws 19 are arranged in alinement longitudinally of the connecter body in closely spaced relation and are threaded in suitable tapped holes formed in a strengthening ridge or rib 20 on the tubular connecter body portion 10. As best shown in Fig. 3, the ends 18 of the set screws 19 are tapered at an angle A which is preferably of the order of about 60 degrees and terminate in flat end surfaces 21 which are of substantially smaller cross sectional area than that of the shank of the screw. For the particular connecter illustrated the surfaces 21 are preferably about $\frac{1}{16}$th of an inch in diameter. These blunt ends of the set screws 19 are hardened in order that they may readily indent the relatively soft steel tubing or conduit.

Figure 4:
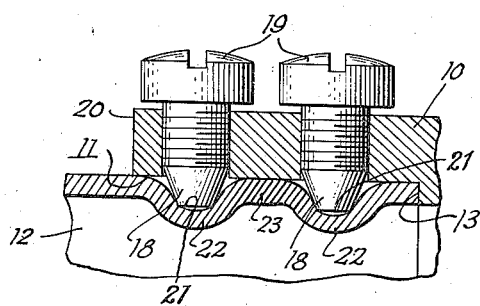
Fig. 4 is an enlarged fragmentary longitudinal sectional view of a part of the connecter shown in Fig. 1 and a portion of the conduit inserted therein illustrating particularly the contour of the inserted portion of conduit after the connecter has been secured thereto.

Upon reference to Fig. 4, it will be seen that the ends 18 of the set screws 19 engage the conduit 12, forming indentations 22 therein. The angularly disposed relation of the ends of the set screws serves to exert a wedging action on the portion of the conduit wall located therebetween, thus compressing the same into a hardened mass as indicated by the heavier crosshatching in Fig. 4 at 23. It has been found that this portion of the conduit is hardened almost to the point of crystallization. The hardened mass or lump of metal thus had forms a bearing shoulder cooperating with the lower end 18 of the outermost set screw 19 to prevent dislodgment of the conduit 12 by an endwise pull. A very effective and simple form of connecter is thus had which meets the requirements of simplicity and ease of manipulation as well as the requirements as to strength of the joint which it forms.

It has been found that the shape of the conduit engaging projections is quite critical especially when set screws are used. Thus, if pointed set screws are substituted for those illustrated, they will pierce the conduit wall and when a strong pull is exerted thereon a slit will be torn in the end portion of the conduit permitting it to be freed from the connecter. On the other hand, if ordinary flat ends are used on the set screws, the gripping action had on the inserted end of the conduit is insufficient to maintain it in position under a heavy pull.

Although a particular embodiment of the invention has been shown and described in some detail for purposes of illustration, there is no intention to thereby limit the invention to this particular embodiment but, on the other hand, the appended claims are intended to cover all modifications within the spirit and scope of the invention.

I claim as my invention:

1. A fitting for thin walled tubular metal conduit provided with a sleeve member arranged to receive an inserted end of the thin walled conduit, and means for securing said sleeve to the inserted conduit, said means including a plurality of adjacent set screws threaded in said sleeve in longitudinal alinement thereon and adapted to deform the wall of the tubular conduit inwardly at spaced points a sufficient distance to form a ridge of hardened metal between the screws for increasing resistance to separation of the conduit from the sleeve member.

2. A fitting for thin walled tubular metal conduit provided with a sleeve member arranged to receive an inserted end of the thin walled conduit, and means for securing said sleeve to the inserted conduit, said means including a plurality of adjacent set screws threaded in said sleeve in longitudinal alinement thereon and provided with elongated tapered blunt points adapted to deform the wall of the tubular conduit inwardly at spaced points a sufficient distance to wedge a ridge of hardened metal between the screw points for increasing resistance to separation of the conduit from the sleeve member.

PAUL O. HECHT.